UNITED STATES PATENT OFFICE 2,680,752

PROCESS AND CATALYST FOR PRODUCING OLEFIN OXIDES

Hervey H. Voge, Berkeley, and Leland T. Atkins, Orinda, Calif., assignors to Shell Development Company, Emeryville, Calif., a corporation of Delaware No Drawing. Application June 29, 1951, Serial No. 234,452

8 Claims. (Cl. 260—348.5)

This invention relates to the preparation of olefin oxides, and it is particularly directed to a method for increasing the activity of silver-surfaced materials employed to catalyze the reaction by which said oxides are produced from olefins and molecular oxygen.

While a variety of materials have been proposed to catalyze the reaction by which olefins are converted to the corresponding oxides, silver and silver-surfaced compositions have proven to be the most effective. Unfortunately, these silver catalysts are relatively unselective and tend to promote the reaction by which the olefins are converted to carbon dioxide instead of the oxide. This reaction is much more exothermic than that leading to the formation of the olefin oxide, with the result that silver catalysts tend to develop hot spots when the reaction is conducted at those higher temperatures which are the most efficient from the standpoint of olefin conversion. Such hot-spotting, or local overheating of the catalyst bed is to be avoided wherever possible since it necessitates shutting down the unit until the desired operating temperatures can again be established, and this is a very expensive procedure. On the other hand, it is not feasible to maintain the catalyst bed at the relatively low operating temperatures where hot-spotting is not encountered, for then the efficiency of the apparatus again drops off to such an extent that the process becomes impractical of operation.

It is therefore a general object of the present invention to provide a method for improving the performance of silver catalysts employed in olefin oxidation reactions. A more particular object is to provide a practical and economical process for the direct catalytic oxidation of olefins to the corresponding olefin oxides which will enable one to obtain a high ratio of olefin oxide to carbon dioxide in the product stream from the reactor, and which will permit the utilization of higher, and more efficient operating temperatures (without risk of forming hot spots in the catalyst bed) than would otherwise be possible. Another object of the invention is to provide a catalyst having improved performance characteristics when employed in direct, vapor phase, olefin oxidation reactions, said catalyst having improved selectivity in the sense of providing improved yields of the desired olefin oxide products, while manifesting little tendency to hot-spot formation, even when employed at relatively high reaction temperatures. A further object is to provide an improved silver catalyst and process for using the same which is of particular utility in reactions involving the direct, vapor phase oxidation of ethylene to ethylene oxide. The nature of still other objects of the invention will be apparent from a consideration of the descriptive portion to follow.

It is our discovery that the above and other objects of the invention are attained by conducting the olefin oxidation reaction in the presence of a silver catalyst which has been admixed or otherwise treated with a selenium- or tellurium-containing additive. Use of these materials in even very small amounts greatly improves the efficiency of the olefin oxidation reaction, the yield of olefin oxide frequently being increased by as much as 20 to 30%. In some cases, addition of the new catalyst components disclosed herein also has the effect of improving the net conversion of olefin to the olefin oxide, any such improvement being primarily attributable to the employment of the higher reaction temperatures whose use, without engendering hot-spotting difficulties, is made possible by a practice of the process of the present invention.

As employed herein, the term "conversion," as applied to the olefin feed, refers to the total amount thereof which is converted to olefin oxide and carbon dioxide, whereas the term "yield" is employed to designate the amount of said converted portion which goes to olefin oxide or to carbon dioxide, as the case may be.

The silver catalysts employed in olefin oxidation reaction can be prepared by any of the methods heretofore practiced in the art. Thus, they can be formed by reduction or decomposition of silver nitrate, silver lactate, silver oxalate, silver oxide or the like with hydrogen or even with the olefinc reactant itself. In another method of preparation, the silver is precipitated by the addition of caustic to an aqueous solution of silver nitrate and dextrose. The catalyst need not be made up entirely of silver, but may also contain minor percentages of other materials such as gold, copper, silver oxide, strontium oxide or the like, all of which materials have heretofore been employed in the catalyst. Again, the catalyst can be supported, if desired, on materials such as silica, alumina, zirconium oxide, or the like, or it can be admixed with relatively large portions of diluent materials such as finely divided alumina, for example, the latter mixtures being particularly useful when the reaction is conducted using the fluidized catalyst technique. The term "silver catalyst," as employed herein, is therefore also intended to embrace not only silver per se, but also those compositions wherein the silver is admixed with other materials, or is supported on the surface of a carrier.

The additives which are combined with the silver catalyst to form the improved catalysts of the present invention can be selected from a wide variety of available materials. Thus, selenium can be added to a catalyst as selenium vapor, as hydrogen selenide vapor or solution, as selenium dioxide vapor, or as a solution of selenic acid, selenious acid, sodium selenate, sodium selenite, ammonium selenide or calcium selenate, for example. In the case of tellurium, the metal can be added, for example, as a powder or in the form of hydrogen telluride vapor or solution, (care being taken to avoid the presence of oxygen which would convert the hydrogen telluride to insoluble, non-volatile tellurium metal), or in the form of a solution of tellurium dioxide, telluric acid, ammonium tellurate, potassium telluride, potassium tellurate, or calcium tellurate, for example. It is also feasible to employ many tellurium and selenium compounds, as the various salts herein mentioned, for example, which can be added to the catalyst in the form of a solid, the latter, in any desired state of division from colloidal size on up, being added either per se, or admixed with or supported on pumice, alumina, or other inert carrier material.

When the above compounds are properly applied to silver catalysts they combine to form materials analogous to silver selenide or telluride on the silver catalyst surface, and these compounds effectively increase the yield of olefin oxide even when present in amounts as small as those corresponding to 5 parts per million (0.0005%) of Se or Te based on the weight of silver present in the catalyst, though good results can also be obtained with additions as large as 0.5%. A preferred range is from 0.001 to 0.05% of Se or Te, again in terms of the weight of silver present in the catalyst.

As indicated above, the selenium- or tellurium-containing materials can be added to the silver component of the catalyst by any one or more of a variety of different methods. The addition can be made before the unit is placed in operation or during a period of shutdown, or the additive can be carried into the catalyst body by the gaseous feed stream or otherwise as the process is in operation. The latter method lends itself particularly well to replenishing the content of the additive in the catalyst composition and thereby maintaining the desired selectivity as the olefin oxidation reaction is maintained in continuous operation. In some cases the selenium- or tellurium-containing additives can be supplied the unit both before the same is placed in operation, as well as either continuously or intermittently during the operating period. In olefin oxidation processes employing a fluidized catalyst, portions of the catalyst compositions can be continuously or periodically withdrawn from the system and supplied with additional amounts of the additive before being reintroduced into the reaction chamber, the amount and periodicity of such additions being determined by observing the rate at which the catalyst composition loses the beneficial characteristics described herein with continued usage.

In carrying out the process of the present invention, a gaseous stream of hydrocarbons comprising an olefin, particularly ethylene, in admixture with oxygen or an oxygen-containing gas, e. g., air, is passed in a continuous manner at elevated temperature conditions over an active silver catalyst which is treated with suitable proportions of the tellurium or selenium additive, as disclosed herein. To assure the attainment and maintenance of the desired reaction temperatures, any suitable means may be resorted to in order to supply heat to the reactants or to the reaction zone, or to withdraw excess heat therefrom during the course of the reaction.

At the conditions of operation at which the olefin and oxygen are brought into contact with the catalyst, the olefin, e. g. ethylene, will react with the oxygen to form the corresponding olefin oxide, for example, ethylene oxide. In accordance with the invention, the oxygen may be present as free oxygen or it may be employed in admixture with other gaseous materials such as air, steam, nitrogen, carbon dioxide, etc. The free oxygen may, if desired, be liberated or formed from oxygen-containing substances in situ at the conditions of operation.

The ratio of oxygen to olefin may vary widely within the scope of the invention, depending upon the conditions at which the operation is carried out. Thus, oxidation of the olefins may be effected by employing the oxygen in amounts less than, equal to, or in excess of the stoichiometric amount needed to combine with the olefin available in the reaction zone. If desired, additional inert diluent fluids, such as nitrogen, carbon dioxide, steam, etc., may be added to the charge subjected to the catalytic oxidation in accordance with the process of the present invention.

The process of the invention may be carried out at any suitable temperature in the broad range of from about 150° C. to about 400° C., though preferably reaction temperatures of from about 200° C. to 350° C. are observed.

Although it is preferable to effect the process of the present invention at pressures in excess of atmospheric, the process may, if desired, be carried out at subatmospheric or at atmospheric pressures. The optimum pressure to be employed will be governed by the conditions of operation and the nature of the materials treated.

Reaction products resulting from the process may be subjected to any subsequent treatment to separate the desired constituent or constituents from the remaining reaction products. For example, the olefin oxide, e. g. ethylene oxide, may be removed from the product stream by any suitable method of separation, comprising fractionation, absorption, adsorption and/or extraction. Any unreacted ethylene, oxygen or gaseous diluents may be recycled to the reactor.

The present invention is illustrated in various of its embodiments by the following examples:

*Example I*

In this operation there is employed a granular silver catalyst obtained on drying and granulating the precipitate formed with the addition of caustic to an aqueous solution of silver nitrate and dextrose. The material so obtained is divided into three portions. One portion is used as such and serves as the control. Another portion is soaked in a 0.017% aqueous solution of selenious acid and then dried, the dried product containing about 0.01% by weight $H_2SeO_3$. The third portion is immersed in an approximately 0.01% aqueous solution of hydrogen telluride and then dried to produce a material containing about 0.01% tellurium. In using these various materials, the catalyst is placed in a heated tube through which a mixture of air and ethylene, in an air/ethylene volume ratio of about 10:1, is passed at atmospheric pressure, and at a rate sufficient to provide an apparent contact time of about 2 seconds. It is found that with the untreated, control catalyst, the maximum average temperature which can be maintained without danger of hot-spotting is about 265° C. Under these conditions the conversion of ethylene is 44.2% and the yield of ethylene oxide is 50%. This procedure is then repeated under the same conditions with the $H_2SeO_3$-treated and $H_2Te$-treated catalysts, but at a reaction temperature of approximately 250° C. (it being found that even higher temperatures than this could be maintained without danger of hot-spotting). The ethylene conversion is 33.3% and the ethylene oxide yield 70% in the case of the selenium-containing catalyst, whereas the ethylene conversion is 19.7% and the ethylene oxide yield is 72% with the catalyst containing tellurium.

While the foregoing tests indicate a falling off in the conversion of ethylene per pass through the reactor, any such loss in activity could have been largely restored by operating at still higher reaction temperatures which it was found could be employed without engendering hot-spot formation. However, this feature is relatively unimportant since the unconverted ethylene can readily be recovered and recycled through the reactor. From the standpoint of economy and efficiency of operation, the important thing is to obtain as high a yield of ethylene oxide as possible.

Example II

The procedure of the foregoing example is repeated, in one case with a silver catalyst containing 0.003% selenium as deposited by passing hydrogen selenide vapor through the catalyst at a temperature of about −40° C., again with a catalyst prepared by grinding the silver with about 0.05% of powdered (grey) selenium, and still again with a catalyst prepared by simply mixing the silver with 0.005% sodium selenate. The performance of these catalysts can be expected to substantially duplicate that of the catalyst impregnated with selenious acid, as described in Example I.

Example III

In this operation there is also employed the procedure outlined in Example I. Here, however, the catalyst is prepared by mixing the silver with 0.005% of potassium telluride. The performance of this catalyst can be expected to substantially duplicate that of the catalyst impregnated with hydrogen telluride, as described in Example I.

Although the catalysts of the present invention are particularly applicable to the catalytic selective conversion of ethylene to ethylene oxide, other olefins may be similarly treated to produce the corresponding olefin oxides. The olefins capable of being thus oxidized to the corresponding olefin oxides in accordance with the process of this invention are the normally gaseous as well as the readily volatile, normally liquid olefins such as ethylene, propylene, butylenes, amylenes and their homologues and suitable substitution products. The olefins may be employed severally or in mixtures containing a plurality of different species thereof, or resort may be made to the use of mixtures thereof with relatively unreactive substances, such as mixtures of olefins and paraffins, which may be employed without resorting to the separation of the olefin or olefins therefrom prior to their being subjected to the oxidation process. Such olefins or olefin-containing mixtures may be obtained from any suitable source, for example, the products resulting from any petroleum refinery operation, e. g. the products resulting from the simple distillation, thermal cracking, hydrogenation, dehydrogenation, polymerization, etc., of hydrocarbon fluids. Also, these fractions may be obtained from processes encountered in the natural gasoline industry, etc.

The invention claimed is:

1. In a process for producing olefin oxides wherein a gaseous mixture containing olefin and oxygen is passed through a solid metallic silver catalyst at temperatures between about 150° C. and 400° C., the step comprising admixing with the said catalyst an additive selected from the group consisting of selenium, tellurium, and the compounds of said metals in an amount of from 0.001% to 0.05%, based on the weight of silver present in the catalyst, whereby the reaction is carried out with a catalyst consisting essentially of uncombined silver and said additive.

2. The process of claim 1 wherein the additive added to the silver catalyst is selenious acid.

3. The process of claim 1 wherein the additive added to the silver catalyst is hydrogen telluride.

4. In a process for producing olefin oxides wherein a gaseous mixture containing olefin and oxygen is passed through a solid metallic silver catalyst at temperatures between about 150° C. and 400° C., the step comprising admixing with the said catalyst a total of from 0.001% to 0.05% (based on the weight of silver present in said catalyst) of selenium, whereby the reaction is carried out with a catalyst consisting essentially of uncombined silver and a selenium compound.

5. The process of making ethylene oxide by the direct reaction of ethylene with molecular oxygen which comprises passing a vaporous mixture of ethylene and molecular oxygen through a reaction zone maintained at a temperature between about 150° C. and 400° C. and containing a catalyst composition consisting essentially of silver having on its surface a total of from 0.001% to 0.05% based on the weight of silver present in the catalyst, an additive selected from the group consisting of selenium, tellurium and the compounds of said metals.

6. The process of claim 5 wherein the additive admixed with the silver catalytic component is selenious acid.

7. The process of claim 5 wherein the additive admixed with the silver catalytic component is hydrogen telluride.

8. The process for producing olefin oxides by the direct reaction of an olefin with molecular oxygen which comprises passing a gaseous mixture of an olefin and molecular oxygen through a reaction zone maintained at a temperature between about 150° C. and 400° C. and containing a catalyst composition consisting essentially of uncombined silver having on the silver catalyst surface selenium in an amount corresponding to 0.001% to 0.05% of selenium based upon the weight of silver present in the catalyst.

References Cited in the file of this patent

UNITED STATES PATENTS

| Number | Name | Date |
|---|---|---|
| 2,178,454 | Metzger | Oct. 31, 1939 |
| 2,366,724 | Gardner | Jan. 9, 1945 |
| 2,366,725 | Gardner | Jan. 9, 1945 |
| 2,383,711 | Clark et al. | Aug. 28, 1945 |
| 2,530,923 | Turk | Nov. 21, 1950 |

FOREIGN PATENTS

| Number | Country | Date |
|---|---|---|
| 13,297 | Great Britain | 1915 |